Patented Aug. 7, 1945

2,381,020

UNITED STATES PATENT OFFICE 2,381,020

ANTISTATIC TREATMENT OF VINYL RESIN TEXTILES

Benjamin G. Wilkes, Wilkinsburg, Pa., and Walter A. Denison, South Charleston, W. Va., assignors to Carbide and Carbon Chemicals Corporation, a corporation of New York No Drawing. Application April 23, 1942, Serial No. 440,246

15 Claims. (Cl. 8—142.5)

This invention relates to the treatment of filaments, fibers, yarns, films, woven, knitted and felted fabrics, and other articles made from or containing water-insoluble vinyl resins, for the purpose of eliminating the tendency of such articles to accumulate charges of static electricity either during the production thereof; during the subsequent treatment of such articles in connection with the usual finishing operations; or in the course of the use of these articles. It has especial utility in the treatment of those of the aforesaid articles which have been made from vinyl resins formed by the polymerization of at least one vinyl compound including a vinyl halide, for rendering the finished fabric more suitable for the manufacture of wearing apparel and industrial fabrics, and for a wide variety of other purposes.

During recent years rapid advances have been made in the development of vinyl resins eminently suitable for use in the production of synthetic fibers, filaments, yarns and fabrics possessing the important properties of high true elasticity, flexibility and high strength, in conjunction with high dielectric strength, controlled shrinkage, and high resistance to water, alkalies and mineral acids, rendering them of outstanding value in the production of textiles for a wide variety of uses. Certain vinyl resins having such characteristics are described in United States Patent No. 2,161,766 of E. W. Rugeley, T. A. Feild, Jr., and J. F. Conlon. As there described, such resins may be produced by the conjoint polymerization of a vinyl halide with a vinyl ester of an aliphatic acid. They generally contain between about 50% and 95% by weight of the halide in the polymer, and have average macromolecular weights of at least 7,500, and preferably of 15,000 or more.

Other halide-containing vinyl resins suitable for use in making articles such as filaments, fibers, yarns, woven, knitted and pile fabrics, etc., include those formed by the conjoint polymerization of a vinyl halide, such as vinyl chloride, with N-alkylated imide derivatives of aliphatic acids such as N-butyl maleimide; vinyl resins formed by the chlorination of polyvinyl chlorides; resins formed by the chlorination of products of the conjoint polymerization of a vinyl halide with a vinyl ester of an aliphatic acid; resins formed by the conjoint polymerization of a vinyl halide, a vinyl ester of an aliphatic acid, and maleic acid; and resins formed by the conjoint polymerization of a vinyl halide, such as vinyl chloride, with nitriles of unsaturated acids, such as acrylonitrile.

Those vinyl resins which contain a substantial percentage of a polyvinyl halide in the molecule are particularly subject to the disadvantage that fibers or other articles made therefrom tend to develop an electrostatic charge upon their surfaces when they are subjected to friction during production, and later during processing of the fibers, and especially during the service life of the finished article.

Many attempts have been made heretofore to devise a treatment of such a vinyl resin composition which will prevent or reduce the accumulation of an electrostatic charge on the surface of articles made therefrom. It is very important that any treatment or additive employed shall provide substantially permanent protection against the development of a static charge on the surface of the article, and at the same time shall not substantially reduce the tensile strength, flexibility, elasticity, resistance to chemical, bacterial and fungal agencies, and other important properties of the vinyl resin so as to render the article unsuitable for the intended purpose. The anti-static protection thereby provided for the surface of the article must be maintained during the normal life of the article, and after repeated washings thereof with the usual detergents, such as soap and water.

The present invention is based in important part upon the discovery that the accumulation of a charge of static electricity upon the surfaces of fibers, filaments, yarns, sheets, foils, woven, knitted and pile fabrics, and other articles made of or containing vinyl resins may be prevented or retarded by treating such articles, preferably after the usual scouring and rinsing operations, with one or more highly basic, water-dispersible polyalkylene imines having average molecular weights of at least 300, and particularly with such higher polymers of ethylene imine.

Those polymers of ethylene imine, and compounds made up of or containing ethylene imine units, that have average molecular weights between around 300 and 1500, are particularly effective, while those having average molecular weights within the range between 800 and 1000 generally are somewhat better than those having molecular weights below or above this range.

The amount of the polyethylene imine or derivative thereof found most suitable for the majority of applications ranges between about 0.5% and 4% of the dry weight of the article being treated; and an amount thereof approximating 1% of the weight of the article is generally preferred.

The polyimine compound preferably is applied to the article in the form of an aqueous solution or emulsion, and in the presence of a suitable wetting agent for the vinyl resin article being treated. The wetting agent may conveniently be used in amounts ranging between 1% and 2% of the dry weight of the article.

The treatment of the article with the polyethylene imine or derivative thereof is then followed by a further treatment of the article—conducted at an elevated temperature, preferably within the range between 40° and 90° C.—with an aqueous solution of at least one water-soluble or water-miscible aliphatic aldehyde containing not more than six carbon atoms in the molecule. If desired, the article may first be removed from the said imine solution, and immersed in a separate bath containing the aldehyde. An aqueous solution of the aldehyde may conveniently be added directly to the solution of the polyethylene imine containing the article after first treating the article with the said imine.

Aliphatic aldehydes suitable for use include the saturated aldehydes of the paraffin series, such as formaldehyde, acetaldehyde, butyraldehyde and n-hexaldehyde; unsaturated olefine aldehydes such as crotonaldehyde, acrolein; alpha methyl acrolein, vinyl acetaldehyde, and hexenal; the heterocyclic unsaturated aldehydes, such as furfural; glyoxal; and the α ketoaldehydes of the paraffin series containing not more than five carbon atoms in the molecule, such as pyruvic aldehyde. Pyruvic aldehyde, crotonaldehyde, furfural and glyoxal are especially effective, and are preferred. Butyraldehyde and formaldehyde are somewhat less effective.

The amount of the aldehyde employed conveniently ranges between 0.5% and 1.5% of the dry weight of the article, although larger or smaller amounts may be used. Thus, 1% of glyoxal, based on the dry weight of the article being treated, gives very satisfactory results.

The static-resistant article may then be rinsed with water, which preferably is warm, and may then be dried in the usual manner; or it may be dyed and scoured before drying.

The polyalkylene imines and derivatives thereof useful in the process include those having closed chain and those having open chain structures, and containing at least five basic nitrogen atoms, and preferably containing at least twenty basic nitrogen atoms, in the average molecule. The presence in the molecule, preferably at one or more nitrogen atoms, of one or more fatty acid residues, and/or one or more other substituents such as alkyl, hydroxyalkyl or aminoalkyl groups containing not more than five carbon atoms, may render the compounds useful for producing certain special characteristics in the finished textiles. Among such fatty acid groups or residues may be mentioned oleic acid, stearic acid, lauric acid, and the other well known higher fatty acid radicals having from ten to twenty carbon atoms. Hydroxyethyl and hydroxypropyl groups may be introduced into the polyimines by suitable treatment of the imines with ethylene oxide and propylene oxide in well known manner.

The following examples are representative of procedures for producing polyethylene imines useful in the process. All parts are given therein in terms of weight:

(a) After allowing a mixture of 100 parts of ethylene imine and 3 parts of concentrated hydrochloric acid to stand at room temperature for 29 days, it was heated to 100° C. under an absolute pressure of 3 mm. of mercury, to remove volatile material. The residual polyethylene imine is a viscous, pleasant-odored mass having an average molecular weight of 1420.

(b) A mixture of 100 parts of ethylene imine and 300 parts of water was refluxed for eighteen hours. The product was stripped free of water, and evaporated at 120° C. under an absolute pressure of 5 mm. of mercury. The residual imine has an average molecular weight of 900.

(c) 10 parts of ethylene diamine, 100 parts of ethylene imine and 323 parts of water were refluxed for eighteen hours. After removing materials volatilizable below 215° C. under an absolute pressure of 2 mm. of mercury, a moderately viscous, colorless and odorless liquid polyethylene imine was obtained, having an average molecular weight of 500.

(d) A mixture of 60 parts of a polyethylene imine having an average molecular weight of 900, 19 parts of oleic acid, and about 88 parts of xylene, was refluxed, water being removed continuously. After six hours the temperature of this mixture had reached 180° C. The product was then stripped of volatile materials at a temperature of 200° C., under an absolute pressure of 25 mm. of mercury, yielding as residue a polyethylene imine derivative in the form of a viscous amber liquid of high molecular weight.

Wetting agents effectively employed in the treating baths of the invention include the alkali metal salts and the basic organic salts of sulfate esters of primary and secondary aliphatic alcohols, particularly those having between eight and twenty carbon atoms in the molecule, such as the sodium and the various ethanolamine salts of lauryl sulfate, and similar salts of sulfate esters of tetradecyl and heptadecyl primary and secondary alcohols. Water-soluble salts of alkylated aromatic sulfonic acids likewise are very suitable. Among suitable wetting agents may be mentioned triethanolamine tetradecyl sulfate, sodium hexadecyl sulfate, sodium lauryl sulfate and lauryl alcohol, sodium oleyl sulfate, and sodium dihexyl sulfosuccinate. The usual soaps or salts of fatty acids are objectionable because of the formation of gummy or other precipitates upon the article in the presence of the polyethylene imines.

The following examples will serve to illustrate the invention.

*Example 1*

Hosiery made from composite yarns formed from a mixture of silk fibers and fibers of a vinyl resin produced by the conjoint polymerization of vinyl chloride with vinyl acetate—as described in United States Patent No. 2,273,071 of E. W. Rugeley and T. A. Feild, Jr.—and which hosiery had been scoured but not dyed, was agitated for thirty minutes at temperatures between 60° and 65° C. in an aqueous solution or treating bath containing 0.1% by weight of a polyethylene imine having an average molecular weight of 900, and 0.1% by weight of the sodium salt of the sulfate ester of diethyltridecanol described in United States Patent No. 2,088,019 of J. N. Wickert, which functioned as a wetting agent. The ratio by weight of the said solution and the hosiery was 20 to 1, thereby providing 2% of the polyethylene imine and 2% of the wetting agent, based on the dry weight of the hosiery. In practice, the ratio by weight of water to hose can be varied considerably.

After the aforesaid thirty minutes agitation of the hosiery in the said treating bath, 0.5% of glyoxal, based on the dry weight of the hosiery, was added to the treating bath, and the agitation continued for fifteen minutes. The hosiery was then rinsed in warm water, dyed, scoured and dried in the usual manner. The finished hosiery showed little tendency to pick up an electrostatic charge, even after repeated washings. The glyoxal treatment effectively served to fix the polyimine more securely within the fibers of the hosiery. The polyethylene imine and the glyoxal treatments can be applied prior to or subsequent to the dyeing operation.

The polyethylene imine used in the foregoing example was prepared by heating an aqueous solution of ethylene imine, containing 25% of the imine, at 100° C. for eighteen hours under reflux. Water and low-boiling materials were then removed by heating the solution to 120° C. while under an absolute pressure of 5 mm. of mercury. The residual polyethylene imine was a viscous colorless oil having an average molecular weight of 900, as determined in well known manner by the boiling point elevation of a methanol solution thereof.

*Example 2*

Knitted hosiery of the type described in Example 1 was treated with the polyethylene imine set forth in that example, under conditions substantially identical with those recited therein. After the treatment of the hosiery with the polyethylene imine in the presence of the wetting agent, pyruvic aldehyde, corresponding to 1% of the dry weight of the hosiery, was added to the treating bath, and the treatment continued for fifteen minutes at 65° C. The hosiery was then dyed, scoured and dried in the usual manner. It developed no appreciable static charge even after repeated washings with aqueous soap solutions.

The invention is applicable for the anti-static treatment of a wide variety of vinyl resins, and particularly those containing a high percentage of polyvinyl chloride in the molecule. Among such vinyl resins are those produced by the conjoint polymerization of vinyl chloride and N-alkyl maleimides; the same resins after being chlorinated; resins produced by the conjoint polymerization of vinyl chloride, vinyl acetate and maleic acid; the products of the chlorination of the vinyl resins produced by the conjoint polymerization of a vinyl halide with a vinyl ester of an aliphatic acid; the resins formed by the chlorination of polyvinyl chlorides; and resins formed by the conjoint polymerization of vinyl chloride and acrylonitrile. In each instance the process effectively eliminates or substantially reduces the tendency to hold electrostatic charges on the surfaces or articles made from or containing such resins.

Vinyl chloride-N-alkyl maleimide copolymers of the type indicated may be produced in well known manner, such as by the process described in British Patent No. 505,120 to Groves. Vinyl resins formed by the conjoint polymerization of a vinyl halide, a vinyl ester of an aliphatic acid and maleic acid may be produced in well known manner in the presence of a suitable catalyst such as dibenzoyl peroxide, as described in the pending United States application Serial No. 306,650 of W. E. Campbell and W. N. Stoops.

The process of the invention is applied to the treatment of such vinyl resins in manner generally similar to that recited in the foregoing examples. However, when treating fibers, filaments, yarns, fabrics and other articles made from or containing vinyl resins produced by the conjoint polymerization of a vinyl halide with a vinyl ester of an aliphatic acid; or similar articles composed of or containing vinyl chloride-N-alkyl maleimide copolymers; or vinyl halide-vinyl ester-maleic acid copolymers; or vinyl chloride-acrylonitrile copolymers; the temperature of the aqueous or other treating solution containing the polyethylene imine or derivative and the wetting agent, and the aqueous solution of the aldehyde, should be maintained within the range between 40° and 65° C., and preferably within the range from around 60° to 65° C. On the other hand, when treating these and other vinyl resin polymers which have been subjected to a chlorination after their production, the temperatures of the respective treating baths conveniently may be maintained at temperatures as high as around 90° C., depending upon the softening point of the resin.

Yarns and fabrics made from fibers of a vinyl resin mixed with fibers of another textile material such as silk, cellulose derivatives such as cellulose acetate, and wool, may be effectively treated by the process, with a corresponding reduction or elimination of the tendency of such articles to hold a surface charge of static electricity.

It is within the scope of the invention to substitute for part or all of the water in the treating solutions, volatile solvents for the polyethylene imine and the aldehyde which are non-solvents for the vinyl resin but may wet the resin, and which solvents are inert to the ethylene imine and to the aldehyde.

The present invention provides marked improvement over processes heretofore employed for eliminating static from fibers and other articles made of or containing a vinyl resin. The present static-eliminating agents appear to be strongly adsorbed by the vinyl resin, whereby the resistance of such agent to removal during washing with the usual type of detergents is greatly increased, prolonging the period of protection against static electricity almost indefinitely. Moreover, whereas certain prior processes imparted a strong disagreeable odor to vinyl resin articles treated therewith for static elimination, the present invention leaves such articles practically odorless.

Articles containing or consisting of vinyl resins produced by the conjoint polymerization of a vinyl halide with a vinyl ester of an aliphatic acid, and containing between about 50% and 95% by weight of the halide in the polymer, and having macromolecular weights of at least 15,000, are especially benefited by the aforesaid antistatic treatment.

The present invention is especially advantageous for the anti-static treatment of vinyl resin fibers, yarns, and articles made therefrom prior to a dyeing operation, since the treatment with the aldehyde renders the polyethylene imine or derivative thereof more permanently fixed to the fibers. Thus finished articles, such as hosiery and other fabrics, are free from any harsh feel or undesirable odor. This is in marked contrast to certain anti-static treatments previously used wherein enough of the anti-static agent was commonly washed off by the scouring action of the dye bath to complicate the dyeing operation and impair the anti-static properties of the finished article. Such former treatments therefore were usually applied after the dyeing operation, resulting in the removal of some of the dyestuff and in an uncontrolled change in the color of the article. This made the technique of dyeing to the proper shade very difficult; and often imparted to the finished article an undesirable harshness.

The term "aliphatic aldehyde," as employed in the accompanying claims, is intended to include cycloparaffin and cycloolefine aldehydes as well as the open-chain aliphatic aldehydes. The alpha hydroxy aldehydes, such as lactic aldehyde, are generally not very effective in the process; and the term "aliphatic aldehyde" is intended to exclude these aldehydes.

We claim:

1. The process of materially reducing the tendency of yarns, filaments, fibers, woven, knitted and felted fabrics and other articles composed of or containing a vinyl resin to accumulate charges of static electricity, which comprises applying to such an article a liquid composition containing as an essential anti-static component at least one water-dispersible compound having a polyethylene imine nucleus, and having an average molecular weight of at least 300, and subsequently treating said article with a water-miscible aliphatic aldehyde having not more than six carbon atoms in the molecule.

2. The process of materially reducing the tendency of yarns, filaments, fibers, woven, knitted and felted fabrics and other articles composed of or containing a vinyl resin to accumulate charges of static electricity, which comprises applying to such an article a liquid composition containing as an essential anti-static component at least one water-dispersible polyethylene imine having an average molecular weight of at least 300, said imine having directly connected with at least one nitrogen atom at least one aminoalkyl group containing not more than five carbon atoms, and subsequently treating said article with a water-miscible aliphatic aldehyde having not more than six carbon atoms in the molecule.

3. The process of materially reducing the tendency of yarns, filaments, fibers, woven, knitted and felted fabrics and other articles composed of or containing a vinyl resin to accumulate charges of static electricity, which comprises applying to such an article a liquid composition containing as an essential anti-static component at least one water-dispersible polyethylene imine having an average molecular weight of at least 300, said imine having directly connected with at least one nitrogen atom a group representing the residue of a higher fatty acid and containing between ten and twenty carbon atoms, and subsequently treating said article with a water-miscible aliphatic aldehyde having not more than six carbon atoms in the molecule.

4. The process of reducing the tendency of yarns, filaments, fibers, woven, knitted and felted fabrics, and other articles composed of or containing a vinyl resin formed by the polymerization of at least one vinyl compound including a vinyl halide to accumulate charges of static electricity, which comprises applying thereto a composition containing a wetting agent and, as an essential anti-static component, a water-dispersible polyethylene imine having an average molecular weight of at least 300, and subsequently applying to the article an aliphatic aldehyde having not more than six carbon atoms in the molecule.

5. The process of reducing the tendency of yarns, filaments, fibers, woven, knitted and felted fabrics, and other articles composed of or containing a vinyl resin formed by the conjoint polymerization of vinyl chloride and vinyl acetate to accumulate charges of static electricity, which comprises applying thereto an aqueous solution containing a wetting agent and, as an essential anti-static component, a water-dispersible polyethylene imine having an average molecular weight of at least 300, and subsequently applying to the article an aliphatic aldehyde having not more than six carbon atoms in the molecule.

6. The process of reducing the tendency of yarns, filaments, fibers, woven, knitted and felted fabrics, and other articles composed of or containing a vinyl resin formed by the polymerization of at least one vinyl compound including a vinyl halide to accumulate charges of static electricity, which comprises applying thereto an aqueous solution containing a wetting agent and, as an essential anti-static component, a water dispersible polyethylene imine having an average molecular weight of at least 300, and subsequently applying glyoxal to said article.

7. The process of reducing the tendency of yarns, filaments, fibers, woven, knitted and felted fabrics, and other articles composed of or containing a vinyl resin formed by the polymerization of at least one vinyl compound including a vinyl halide to accumulate charges of static electricity, which comprises applying thereto an aqueous solution containing a wetting agent and, as an essential anti-static component, a water-dispersible polyethylene imine having an average molecular weight of at least 300, and subsequently applying pyruvic aldehyde to said article.

8. The process of reducing the tendency of yarns, filaments, fibers, woven, knitted and felted fabrics, and other articles composed of or containing a vinyl resin to accumulate charges of static electricity, which comprises applying to such an article a composition containing a wetting agent and, as an essential anti-static component, a polyethylene imine having an average molecular weight within the range between 300 and 1500, and subsequently applying to the article a water-miscible aldehyde having not more than six carbon atoms in the moluecule.

9. The process of reducing the tendency of yarns, filaments, fibers, woven, knitted and felted fabrics, and other articles composed of or containing a vinyl resin to accumulate charges of static electricity, which comprises applying to such an article a composition containing a wetting agent and, as an essential anti-static component, an N-substituted polyethylene imine containing at least five basic nitrogen atoms in the average molecule, and subsequently applying to the article thus treated an aliphatic aldehyde having not more than six carbon atoms in the molecule.

10. The process of reducing the tendency of yarns, filaments, fibers, woven, knitted and felted fabrics, and other articles composed of or containing a vinyl resin to accumulate charges of static electricity, which comprises applying to such an article an aqueous solution containing a wetting agent and, as an essential anti-static component, the reaction product of a higher fatty acid with a polyalkylene imine, said reaction product having an average molecular weight of at least 300, and subsequently applying to the article thus treated an aliphatic aldehyde having not more than six carbon atoms in the molecule.

11. The process of reducing the tendency of yarns, filaments, fibers, woven, knitted and felted fabrics, and other articles composed of or containing a vinyl resin formed by the polymerization of at least one vinyl compound including a vinyl halide to accumulate charges of static electricity, which comprises applying thereto a composition containing a wetting agent and, as an essential anti-static component, an aqueous solution of a polyethylene imine having an average molecular weight of at least 300, and subsequently applying to the thus treated article, at an elevated temperature not substantially higher than 90° C., an aqueous solution of an aliphatic aldehyde having not more than six carbon atoms in the molecule.

12. Textile yarns and fibers composed of or containing a vinyl resin formed by the polymerization of at least one vinyl compound including a vinyl halide, and having an average macromolecular weight of at least 7500, said yarns and fibers being resistant to the tendency to accumulate thereon charges of static electricity, and having been treated with a polyethylene imine having an average molecular weight of at least 300, in the presence of a wetting agent, and having been subsequently treated with an aliphatic aldehyde having not more than six carbon atoms in the molecule.

13. Textile yarns and fibers composed of or containing a vinyl resin formed by the polymerization of at least one vinyl compound including a vinyl halide, and having an average macromolecular weight of at least 7500, said yarns and fibers being resistant to the tendency to accumulate thereon charges of static electricity, and having been treated, in the presence of a wetting agent, with a substituted polyalkylene imine having an average molecular weight of at least 300 and containing at least five basic nitrogen atoms in the average molecule, and having been subsequently treated with an aliphatic aldehyde having not more than six carbon atoms in the molecule.

14. Yarns, fibers, films, woven, knitted and felted fabrics, and other articles having permanent anti-static properties, which article comprises a vinyl resin formed by the polymerization of at least one vinyl compound including a vinyl halide, said article having been treated, in the presence of a wetting agent, with a water-dispersible compound having a polyethylene imine nucleus and having an average molecular weight of at least 300, the said articles thereafter having been further treated with an aqueous solution of an aliphatic aldehyde having not more than six carbon atoms in the molecule.

15. The process of materially reducing the tendency of yarns, filaments, fibers, woven, knitted and felted fabrics and other articles composed of or containing a vinyl resin having a high percentage of polyvinyl halide in the molecule to accumulate charges of static electricity, which comprises applying to such an article a dilute aqueous solution containing as an essential anti-static component at least one water-dispersible compound having a polyethylene imine nucleus and having an average molecular weight of at least 300, and subsequently treating said article with a water-miscible unsaturated aliphatic aldehyde having not more than six carbon atoms in the molecule.

BENJAMIN G. WILKES.
WALTER A. DENISON.